(12) United States Patent
Watanabe et al.

(10) Patent No.: US 12,582,980 B2
(45) Date of Patent: Mar. 24, 2026

(54) FLUID HANDLING DEVICE AND FLUID HANDLING SYSTEM

(71) Applicant: Enplas Corporation, Saitama (JP)

(72) Inventors: Yasuhiro Watanabe, Saitama (JP); Nobuya Sunaga, Saitama (JP); Koichi Ono, Saitama (JP)

(73) Assignee: Enplas Corporation, Saitama (JP)

( * ) Notice: Subject to any disclaimer, the term of this patent is extended or adjusted under 35 U.S.C. 154(b) by 788 days.

(21) Appl. No.: 17/959,346

(22) Filed: Oct. 4, 2022

(65) Prior Publication Data

US 2023/0158486 A1    May 25, 2023

(30) Foreign Application Priority Data

Oct. 22, 2021    (JP) .................................. 2021-173266

(51) Int. Cl.
  B01L 3/00        (2006.01)
  F16K 99/00        (2006.01)
(52) U.S. Cl.
  CPC .......... B01L 3/502 (2013.01); F16K 99/0015 (2013.01); F16K 99/0034 (2013.01); B01L 2200/027 (2013.01); B01L 2400/0481 (2013.01); B01L 2400/0622 (2013.01); B01L 2400/0638 (2013.01); F16K 2099/0084 (2013.01)
(58) Field of Classification Search
  CPC ............... B01L 3/502; B01L 2200/027; B01L 2400/0481; B01L 2400/0622; B01L 2400/0638; B01L 2200/0689; B01L 2300/0816; B01L 2400/0487; B01L 2400/0644; B01L 3/502715; B01L 3/502738; F16K 99/0015; F16K 99/0034; F16K 2099/0084
See application file for complete search history.

(56) References Cited

U.S. PATENT DOCUMENTS

2011/0233443 A1    9/2011   Kamada et al.
2022/0072543 A1*   3/2022   Ang ........................ B01L 7/00

FOREIGN PATENT DOCUMENTS

JP       2011-202681       10/2011
WO     WO2021066744     *   4/2021

OTHER PUBLICATIONS

WO2021066744 (Year: 2021).*

* cited by examiner

*Primary Examiner* — Samuel P Siefke

(57)        ABSTRACT

A fluid handling device includes: a channel chip including a well for containing a fluid, a channel connected to the well, a valve disposed on the channel, and a through hole; and a pressing member including a first protrusion and a second protrusion, the first protrusion being for pressing the valve to close the valve, the second protrusion being inserted into the through hole and being for positioning the first protrusion with respect to the valve, the pressing member being rotatable about a rotational axis extending through the second protrusion.

7 Claims, 10 Drawing Sheets

200(210)

211    212    212    230

212

214    213

212

211

FLUID HANDLING DEVICE AND FLUID HANDLING SYSTEM

CROSS REFERENCE TO RELATED APPLICATIONS

This application is entitled to and claims the benefit of Japanese Patent Application No. 2021-173266, filed on Oct. 22, 2021, the disclosure of which including the specification, drawings and abstract is incorporated herein by reference in its entirety.

TECHNICAL FIELD

The present invention relates to a fluid handling device and a fluid handling system.

BACKGROUND ART

In recent years, a channel chip has been used in order to conduct an analysis of a trace amount of substance such as a protein or a nucleic acid with high accuracy and at high speed. Advantageously, the channel chip requires only a small amount of reagents and samples for the analysis, and are expected to be used in various applications such as clinical tests, food tests, and environmental tests. A plurality of channels are usually arranged in the channel chip, and it is required to selectively flow a desired reagent, a sample, or the like in a desired channel. To this end, a valve including a diaphragm may be disposed between the plurality of channels. Patent Literature (hereinafter, referred to as "PTL") 1 discloses diaphragm valves disposed between a plurality of channels.

CITATION LIST

Patent Literature

PTL 1
Japanese Patent Application Laid-Open No. 2011-202681

SUMMARY OF INVENTION

Technical Problem

The channel chip as described above is used with a pressing member for pressing the diaphragm of the valve. Specifically, when the channel chip is attached to a device having the pressing member, the pressing member is disposed at a position where the pressing member is capable of pressing the valve of the channel chip. Introduction of a fluid into the channel chip is performed in a state in which the valve is closed by the pressing member after the channel chip is attached to the device.

Here, it is assumed that a situation occurs in which it is desired that a fluid such as a reagent be introduced into the channel chip in advance and be retained before the channel chip is attached to the device having the pressing member. However, as described above, the valve is closed by the pressing member. Thus, the fluid flows into an unintended channel when the fluid is introduced into the channel chip before the channel chip is attached to the device.

An object of the present invention is to provide a fluid handling device capable of appropriately retaining a fluid even when the fluid is introduced in advance. Another object of the present invention is to provide a fluid handling system including the fluid handling device.

Solution to Problem

The present invention provides the following fluid handling device.

A fluid handling device including: a channel chip including a well for containing a fluid, a channel connected to the well, a valve disposed on the channel, and a through hole; and a pressing member including a first protrusion and a second protrusion, the first protrusion being for pressing the valve to close the valve, the second protrusion being inserted into the through hole and being for positioning the first protrusion with respect to the valve, the pressing member being rotatable about a rotational axis extending through the second protrusion.

The present invention provides the following fluid handling system.

A fluid handling system including: a fluid handling device described above; and a drive section for rotating the pressing member.

Advantageous Effects of Invention

According to the present invention, it is possible to provide a fluid handling device capable of appropriately retaining a fluid even if a fluid is introduced in advance. Also, according to the present invention, it is possible to provide a fluid handling system including the fluid handling device.

DESCRIPTION OF EMBODIMENTS

Figure 1:
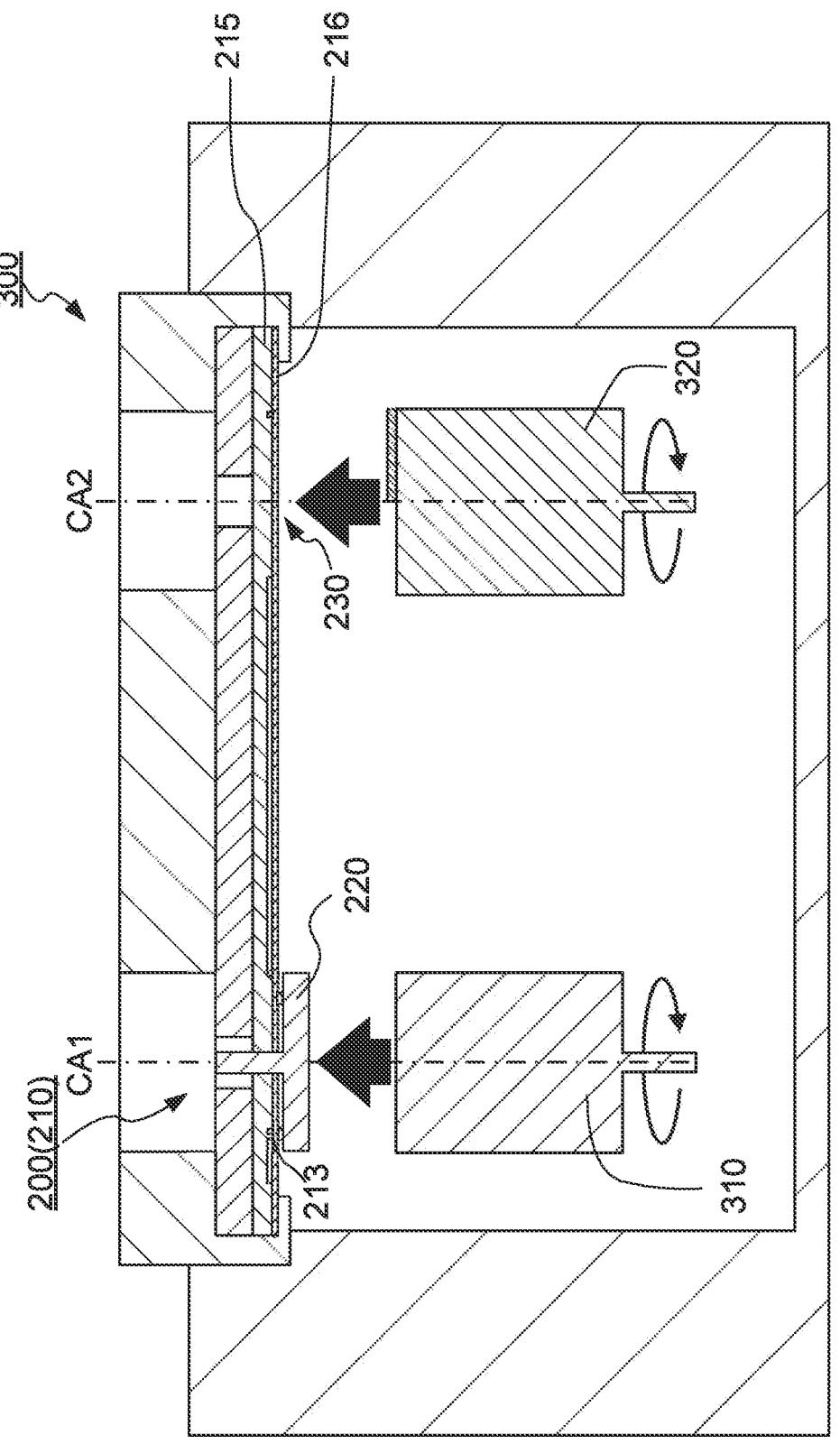
FIG. 1 is a schematic sectional view illustrating a configuration of a fluid handling system according to an embodiment.

Embodiments (Fluid Handling System)
FIG. 1 illustrates a sectional view of fluid handling system 300 according to one embodiment of the present invention. As illustrated in FIG. 1, fluid handling system 300 includes fluid handling device 200, valve drive section 310, and pump drive section 320. Fluid handling device 200 is driven by rotating valve drive section 310 and rotating pump drive section 320. Specifically, valve drive section 310 rotates pressing member 220 of fluid handling device 200 by a rotational motion to control the opening and closing of valves of channel chip 210. Similarly, pump drive section 320 drives pump 230 of channel chip 210 by a rotational motion.

In FIG. 1, for clarity of the configuration of fluid handling system 300, fluid handling device 200 spaced from valve drive section 310 and pump drive section 320 is illustrated. (Configuration of Fluid Handling Device)

Figure 2A:
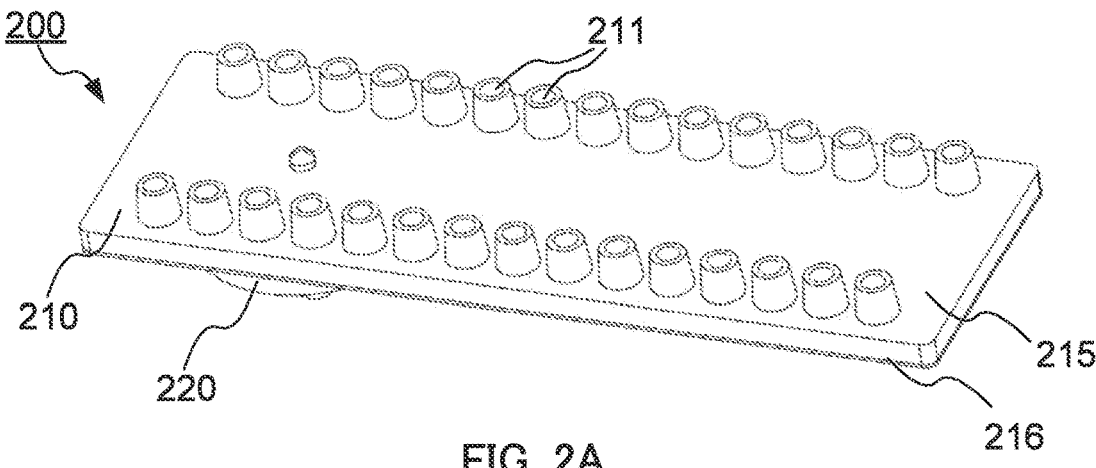
FIGS. 2A to 2C are diagrams illustrating a configuration of the fluid handling device according to the embodiment.
Figure 2B:
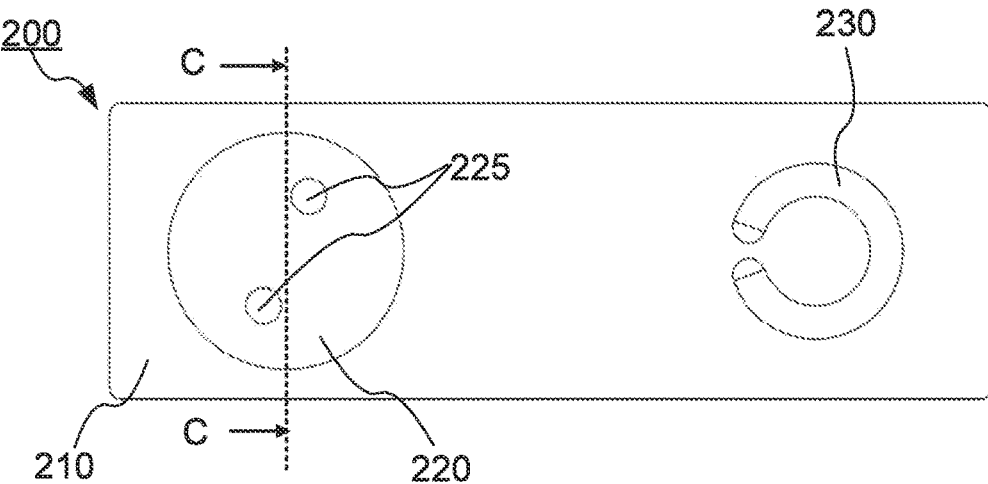
Figure 2C:
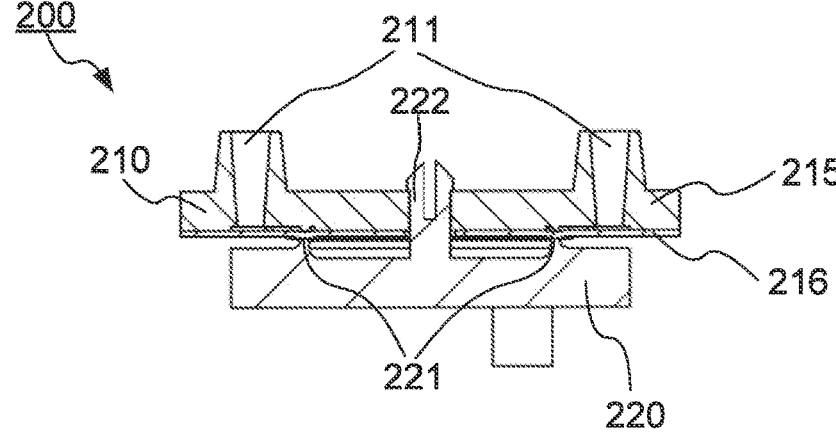
Figure 3:
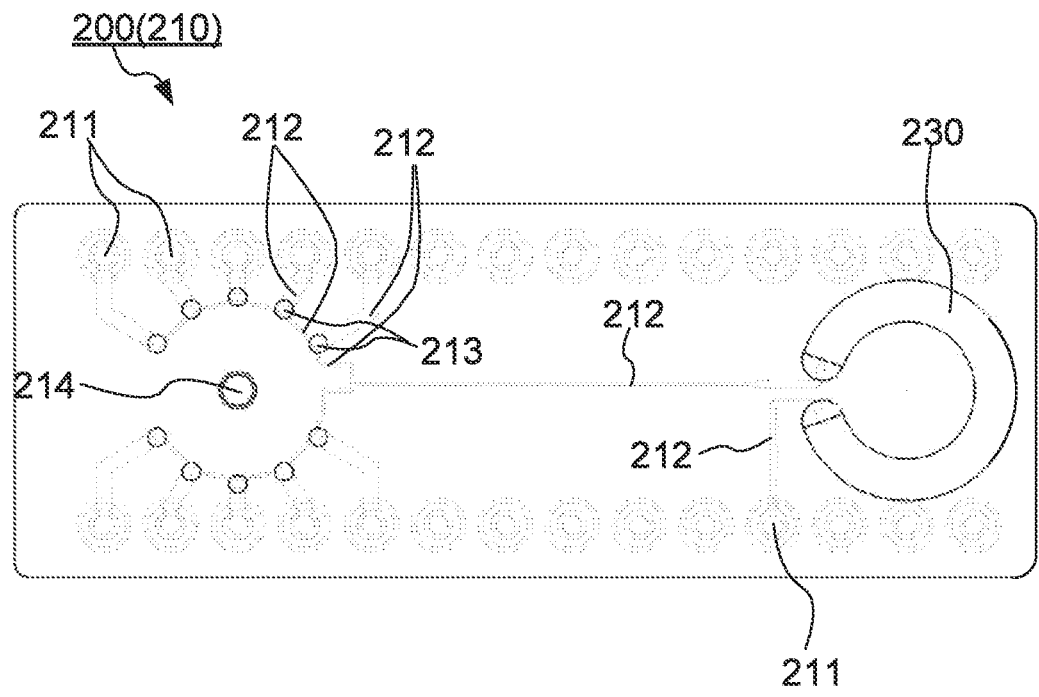
FIG. 3 is a diagram illustrating a configuration of the fluid handling device according to the embodiment.

FIG. 2A is a perspective view of fluid handling device 200 of the present embodiment. FIG. 2B is a bottom view of fluid handling device 200 according to the present embodiment. FIG. 2C is a cross-sectional view taken along C-C line in FIG. 2B. FIG. 3 is a bottom view of fluid handling device 200 from which pressing member 220 is removed. That is, FIG. 3 is a bottom view of channel chip 210. In FIG. 3, the internal structure and the front-side structure of fluid handling device 200 are indicated by broken lines. FIGS. 4A to 4D are views illustrating pressing member 220.

Fluid handling device 200 includes channel chip 210 and pressing member 220 (see FIGS. 2A to 2C).

Channel chip 210 includes wells 211, channels 212, valves 213, through hole 214, and pump 230 (see FIG. 3). Pressing member 220 includes first protrusion 221 and second protrusion 222 (see FIGS. 4A to 4D). Further, pressing member 220 may include third protrusion 223 (see FIG. 4D).

In the present embodiment, wells 211 are formed by bonding film 216 to substrate 215 so as to close holes and grooves formed in substrate 215. Channels 212 are formed by bonding film 216 to substrate 215 so as to close grooves formed in substrate 215. In addition, pump 230 is formed by bonding, to substrate 215, film 216 formed in a dome-shape (convex shape) with respect to substrate 215 (see FIGS. 1, 2A, 2B, and 2C). Hereinafter, each component will be described.

Substrate 215 is a plate-shaped member. Holes serving as wells 211 and grooves for serving as channels 212 are formed in substrate 215.

The material contained in substrate 215 may be appropriately selected from, for example, known resins and glasses. Examples of materials included in substrate 215 include polyethylene terephthalate, polycarbonate, polymethyl methacrylate, polyvinyl chloride, polypropylene, polyether, polyethylene, polystyrene, cycloolefin-based resins, silicone resins, and elastomers. The size and thickness of substrate 215 are appropriately selected in accordance with the application of fluid handling device 200, the depth and width of the grooves in substrate 215, and the like. The thickness of substrate 215 is, for example, between 1 mm and 10 mm.

Film 216 is a substantially flat plate-shaped member. In the present embodiment, film 216 functions not only as a member covering the grooves and holes in substrate 215, but also as a diaphragm of valves 213 and a diaphragm of pump 230. Therefore, film 216 is made of a flexible material. Note that, portions of film 216 functioning as the diaphragms may have a flat plate shape or a dome shape (convex shape). In the present embodiment, the diaphragms have a dome shape (convex shape).

Examples of materials included in film 216 include polyethylene terephthalate, polycarbonate, polymethyl methacrylate, polyvinyl chloride, polypropylene, polyether, polyethylene, polystyrene, cycloolefin-based resins, silicone resins, and elastomers.

Wells 211 are capable of containing a liquid. Each of wells 211 functions as an introduction portion for introducing a fluid into channel 212 in fluid handling device 200, an extraction portion for extracting the fluid in channel 212 in fluid handling device 200, a treatment portion for mixing or reacting a fluid, a vent hole used during movement of a fluid in channel 212 in fluid handling device 200, or the like.

Well 211 is a bottomed recess having an opening on the front side of channel chip 210. Well 211 is formed by a hole formed in substrate 215 and film 216 that closes the hole. The shape and size of well 211 are not particularly limited as long as the above functions can be exhibited. The shape of the internal space of well 211 is, for example, a substantially frusto-conical shape or a substantially cylindrical shape. In the present embodiment, the shape of the internal space of well 211 is a frusto-conical shape. In the present embodiment, an outer wall surrounding the inner space of well 211 protrudes from the surface of substrate 215 on the front side of fluid handling device 200. The number of wells 211 is not particularly limited and is appropriately selected depending on the application of fluid handling device 200. In the present embodiment, a plurality of wells 211 are provided.

Channels 212 are connected to wells 211. Channels 212 serve as paths for fluid from wells 211 or for fluid to wells 211. Channels 212 are formed by grooves formed in substrate 215 and film 216 that covers the grooves.

In the present embodiment, channels 212 include channel 212 extending in a circular arc shape, a plurality of channels 212 extending radially from the circular-arc-shaped channel toward wells 211, and one channel 212 extending from the circular-arc-shaped channel toward pump 230 (see FIG. 3). One ends of channels 212 are connected to the wells, and the other ends are connected to pump (rotary membrane pump) 230 (see FIG. 3).

The cross-sectional area and the cross-sectional shape of channel 212 are not particularly limited. The cross-sectional shape of channel 212 is, for example, a substantially rectangular shape with sides having lengths (width and depth) of about several tens of μm. The cross section of channel 212 means a cross section of the channel orthogonal to the direction in which the fluid flows. Valves 213 for controlling the flow of the fluid are disposed on channels 212.

Valves 213 are disposed on channels 212 to control the flow of fluid. In the present embodiment, a plurality of valves 213 are disposed (at connecting portions) between radially extending channels 212 and channel 212 extending in a circular arc shape.

The configuration of valves 213 is not particularly limited as long as the flow of the fluid can be controlled by the valves being pressed by first protrusion 221 of pressing member 220. In the present embodiment, each of valves 213 includes a valve seat and a diaphragm (a part of film 216). At valve 213, the diaphragm makes contact with the valve seat to close the valve. Movement of the diaphragm to the valve seat is caused by first protrusion 221 of pressing member 220.

It is preferable that a plurality of valves 213 be disposed on a circle centered on through hole 214 (see FIG. 3). When valves 213 are disposed in this manner, it is possible to close a desired valve by rotating pressing member 220 about through hole 214. That is, it is preferable that valves 213 be a rotary membrane valve controlled by the rotation of pressing member 220.

Figure 5A:
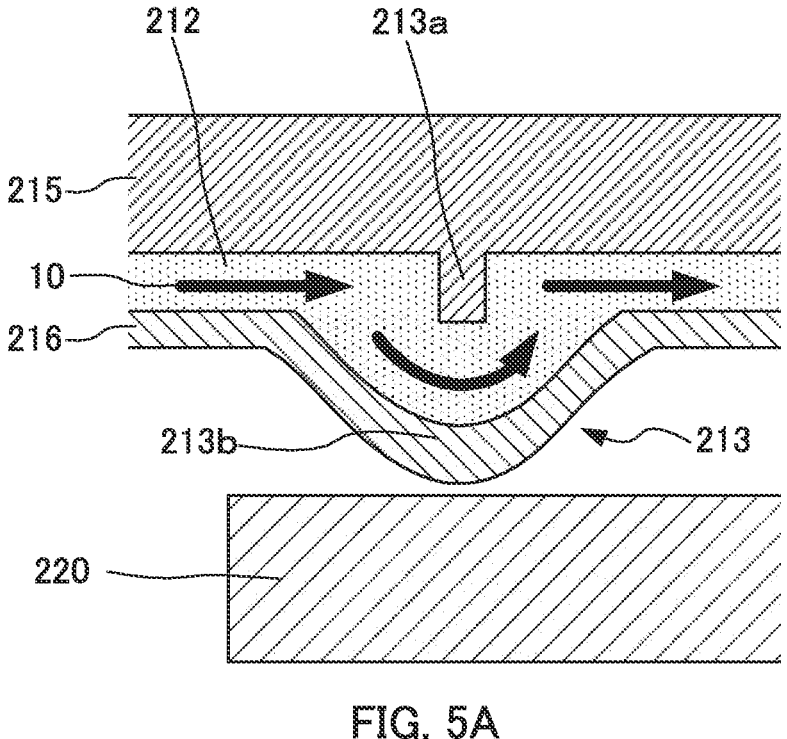
FIGS. 5A and 5B are sectional views illustrating one example of a valve.
Figure 5B:
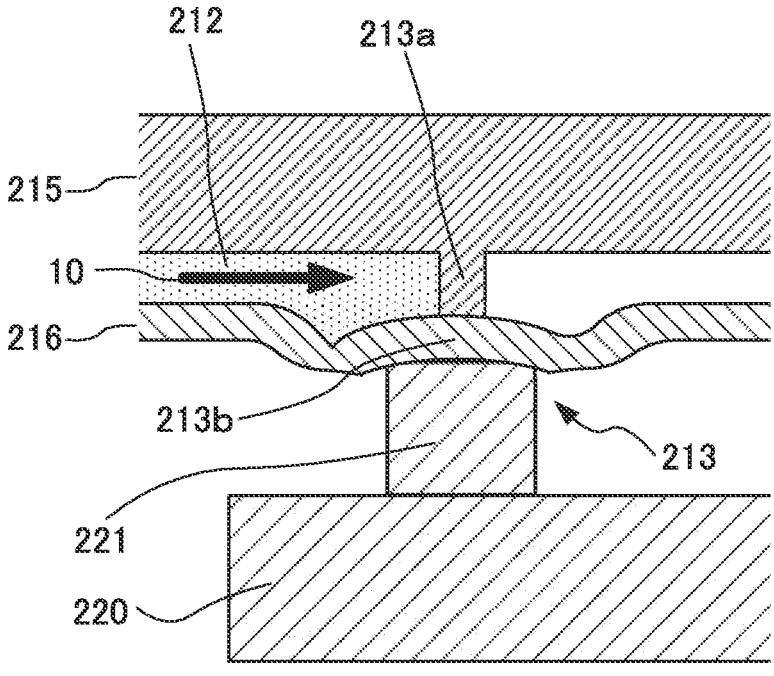

FIGS. 5A and 5B are schematic diagrams illustrating a section of one example of valve 213. FIGS. 5A and 5B are sectional views of valve 213 along a direction in which fluid 10 flows. Valve 213 illustrated in FIGS. 5A and 5B includes protruding valve seat 213a protruding from the bottom portion of channel 212. The height of valve seat 213a is the same as the height of the front surface of substrate 215. Further, this valve 213 includes diaphragm 213b (a part of film 216) formed in a dome-like shape (convex shape) so as to face protruding valve seat 213a. Dome-shaped diaphragm 213b is pressed by first protrusion 221 of pressing member 220. Accordingly, diaphragm 213b makes contact with valve seat 213a and valve 213 closes, preventing the flow of fluid 10 (see FIG. 5B).

Figure 6A:
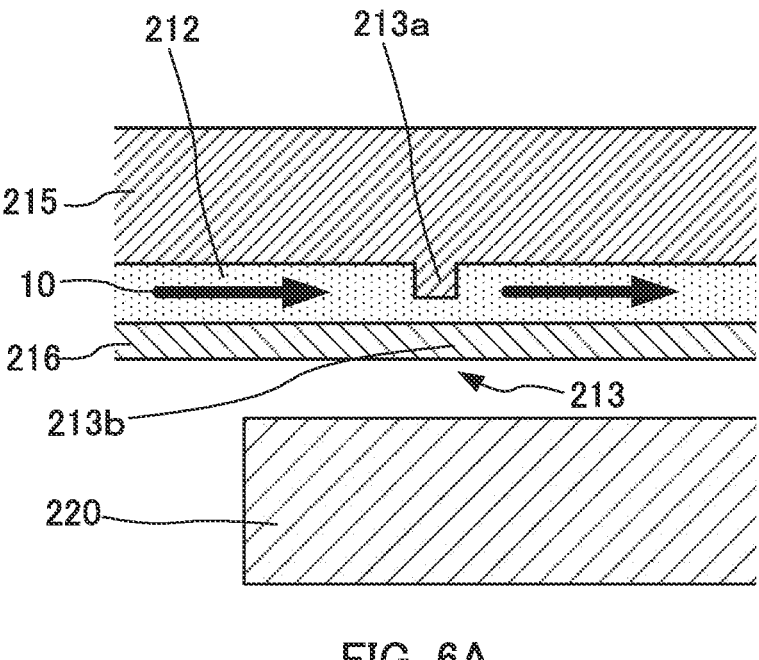
FIGS. 6A and 6B are sectional views illustrating of one example of the valve.
Figure 6B:
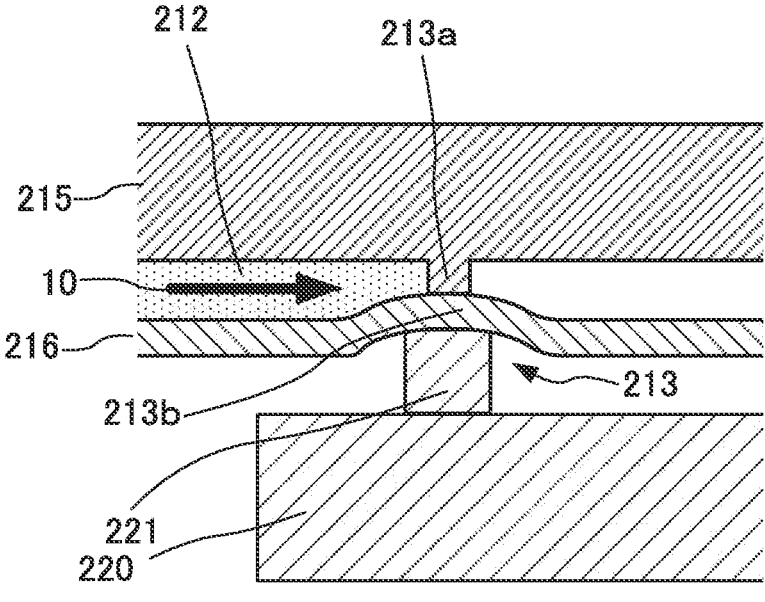

FIGS. 6A and 6B are schematic views illustrating sections of another example of the valve. FIGS. 6A and 6B are sectional views of the valve along the direction in which fluid 10 flows. Valve 213 illustrated in FIGS. 6A and 6B includes protruding valve seat 213a protruding from the bottom portion of channel 212. This valve seat 213a is relatively lower in height than valve seat 213a illustrated in FIGS. 5A and 5B. Specifically, the height of valve seat 213a illustrated in FIGS. 6A and 6B is lower than the height of the front surface of substrate 215. Correspondingly, diaphragm 213b (part of film 216) facing valve seat 213a is flat. Flat diaphragm 213b is pressed by first protrusion 221 of pressing member 220. As a result, diaphragm 213b makes contact with valve seat 213a and valve 213 closes, preventing the flow of fluid 10 (see FIG. 6B).

Through hole 214 is a hole that is disposed in channel chip 210 and into which second protrusion 222 of pressing member 220 is inserted (see FIG. 3). In the present embodiment, through hole 214 is disposed at the center of the plurality of valves 213 disposed on a circle. In addition, in the present embodiment, through hole 214 has a cylindrical shape. When second protrusion 222 of pressing member 220 is inserted into through hole 214, the first protrusion of pressing member 220 is positioned with respect to valves 213. In addition, through hole 214 serves as a center of rotation of pressing member 220. By the rotation of pressing member 220 around through hole 214 (second protrusion 222), it is possible to open and close valves 213.

Figure 4A:
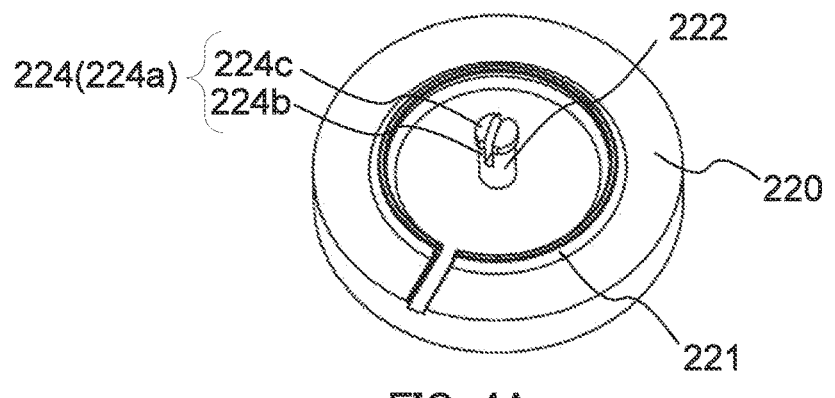
FIGS. 4A to 4D are diagrams illustrating a configuration of a pressing member.
Figure 4B:
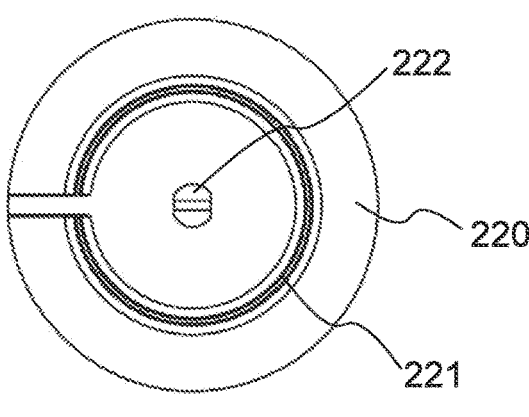
Figure 4C:
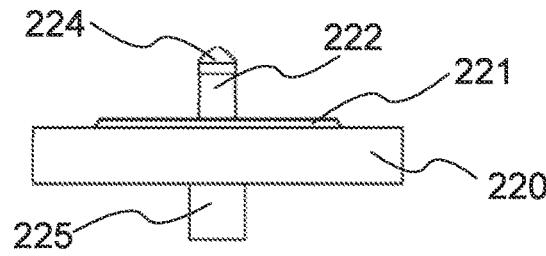
Figure 4D:
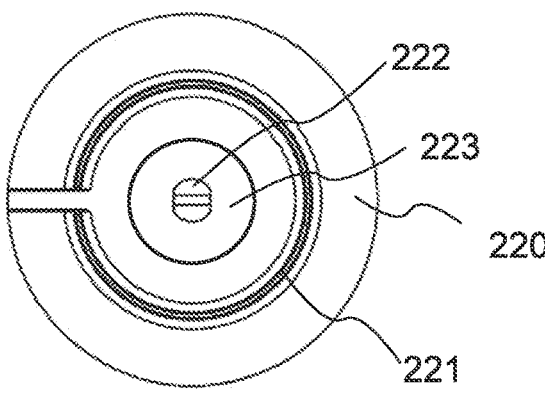

FIGS. 4A to 4C are diagrams illustrating pressing member 220. FIG. 4A is a perspective view, FIG. 4B is a plan view, and FIG. 4C is a side view of pressing member 220. FIG. 4D is a plan view of pressing member 220 which includes third protrusion 223.

As illustrated in 4A to 4C, pressing member 220 includes first protrusion 221 and second protrusion 222.

First protrusion 221 is for closing the valves. The configuration of first protrusion 221 is not particularly limited as long as the valves can be closed. In the present embodiment, first protrusion 221 has a circular shape (circular arc shape), which as seen in plan view, includes a cutout. In the present embodiment, the circle is a circle centered on second protrusion 222. When the cutout portion of the circle is at valve 213, valve 213 is in an open state, and when a portion other than the cutout (first protrusion 221) is at valves 213, valve 213 is in a closed state.

Second protrusion 222 is inserted into through hole 214 in channel chip 210, and positions first protrusion 221 with respect to valves 213. The configuration of second protrusion 222 is not particularly limited as long as it can perform the above-described functions. In the present embodiment, when pressing member 220 is seen in plan view, second protrusion 222 is disposed at the center of pressing member 220. In addition, in the present embodiment, second protrusion 222 has a cylindrical shape. It is preferable that second protrusion 222 have a structure for preventing pressing member 220 from being detached from channel chip 210.

Specifically, it is preferable that second protrusion 222 have first engagement portion 224 that is engageable with channel chip 210 when the second protrusion is inserted into through hole 214. In the present embodiment, second protrusion 222 includes snap-fit structure 224a at its tip end as first engagement portion 224 as illustrated in FIGS. 4A and 4C. Snap-fit structure 224a fixes pressing member 220 with respect to channel chip 210 such that the pressing member is rotatable. In the present embodiment, snap-fit structure 224a includes two structures, each of which includes leaf spring 224b and hook 224c disposed at the tip end of leaf spring 224b, as illustrated in FIG. 4A. Two leaf springs 224b are formed by forming a cutout in a flat plate shape in the tip end of second protrusion 222. Two hooks 224c at the tip ends of two leaf springs 224b are disposed to face away from each other (disposed to face outward from the center of second protrusion 222). Note that snap-fit structure 224a presses channel chip 210 toward the first protrusion 221 side of the pressing member when the snap-fit structure is engaged with channel chip 210. That is, snap-fit structure 224a also serves as a spring mechanism for causing the pressing member (first protrusion 221) to push the valves of channel chip 210.

Pressing member 220 may include third protrusion 223. FIG. 4D is a plan view of pressing member 220 including third protrusion 223. Third protrusion 223 is disposed between first protrusion 221 and second protrusion 222. Third protrusion 223 has any configuration. Third protrusion 223 prevents channel chip 210 from bending when first protrusion 221 presses the valves.

Specifically, when pressing member 220 is fixed to channel chip 210 by second protrusion 222, channel chip 210 is bent by being pressed by circular-arc-shaped first protrusion 221. At this time, a portion of channel chip 210 which is pressed by first protrusion 221 moves in a direction away from pressing member 220 relatively, and a portion of channel chip 210 around second protrusion 222 moves in a direction approaching pressing member 220 relatively. Third protrusion 223 is disposed between first protrusion 221 and second protrusion 222, and suppresses movement of the portion of channel chip 210 around second protrusion 222 in the direction relatively approaching pressing member 220, thereby suppressing deflection of channel chip 210.

The configuration of third protrusion 223 is not particularly limited as long as this function can be exerted. It is preferable that the height of third protrusion 223 be substantially the same as or slightly lower than the height of first protrusion 221 so as to be able to exert the above-described function by making contact with channel chip 210 bent by being pressed by first protrusion 221.

It is preferable that pressing member 220 have second engagement portion 225 for being engaged with valve drive section 310, which will be described later, as illustrated in FIGS. 2B and 4C. Second engagement portion 225 is disposed on the rear surface of pressing member 220. In the present embodiment, second engagement portion 225 is a protrusion, and there are two protrusions. The protrusions are engaged by being inserted into recessed portions in valve drive section 310.

Pump 230 is for moving fluid 10 introduced into fluid handling device 200. Pump 230 includes substrate 215 and film (diaphragm) 216 formed in a dome shape (convex shape) with respect to substrate 215. In the present embodiment, pump 230 as seen in plan view has a circular arc shape, and pump 230 is a rotary membrane pump. Pump 230 is driven by pump drive section 320 rotating about second central axis CA2. Specifically, pump 230 is driven by rotation performed by the protrusion disposed on the top portion of pump drive section 320 while pressing the diaphragm of pump 230 toward substrate 215. One end of pump 230 is connected to channel 212 for a flow toward valves 213, and the other end is connected to channel 212 for a flow toward well 211. Well 211 in communication with pump 230 via channel 212 functions as an exhaust hole or an intake hole when pump 230 is driven (see FIG. 3).

Figure 7A:
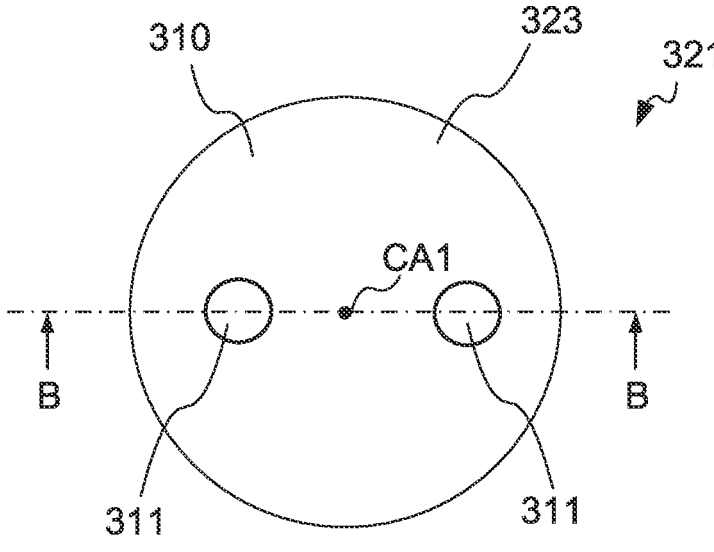
FIGS. 7A and 7B are diagrams illustrating a configuration of a valve drive section.
Figure 7B:
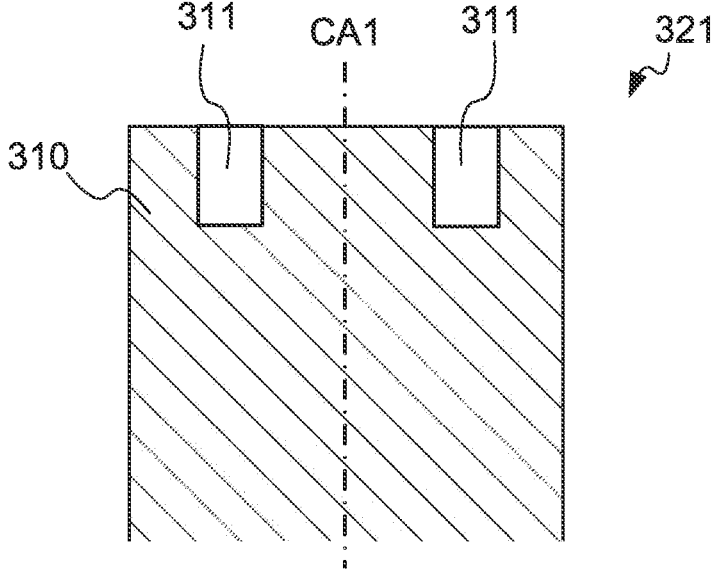

FIGS. 7A and 7B illustrate valve drive section 310 for rotating pressing member 220. FIG. 7A is a plan view of valve drive section 310, and FIG. 7B is a sectional view taken along B-B line in FIG. 7A. Valve drive section 310 rotates about first rotational axis CA1. When valve drive section 310 rotates, pressing member 220 rotates, and valves 213 are opened and closed. It is preferable that valve drive section 310 have third engagement portions 311 that are engaged with second engagement portions 225 of pressing member 220. In the present embodiment, third engagement portions 311 are recessed portions disposed in the top portion of valve drive section 310. By inserting (engaging) the protrusions (the second engagement portions) of pressing member 220 into the recessed portions (the third engagement portions), pressing member 220 and valve drive section 310 are fixed to each other. Valve drive section 310 is a substantially cylindrical member.

Figure 8A:
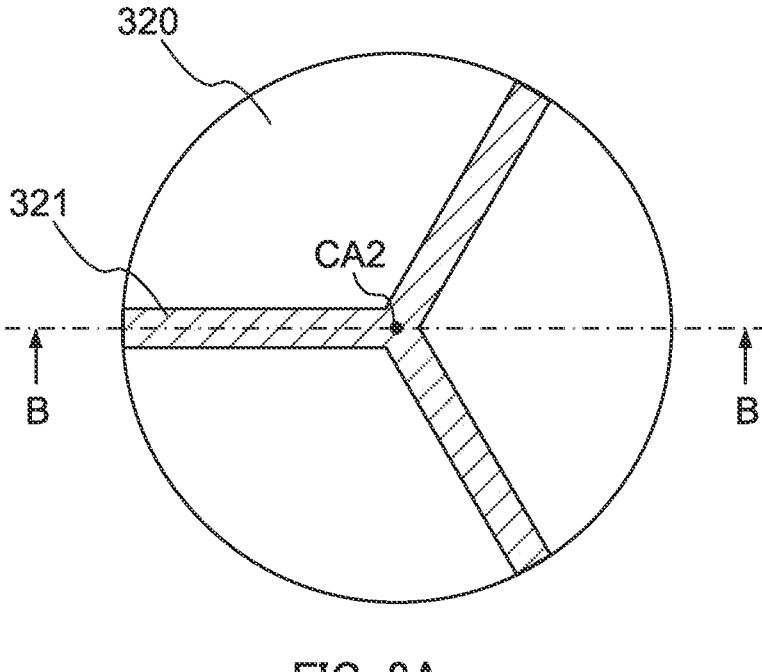
FIGS. 8A and 8B illustrate a configuration of a pump drive section.
Figure 8B:
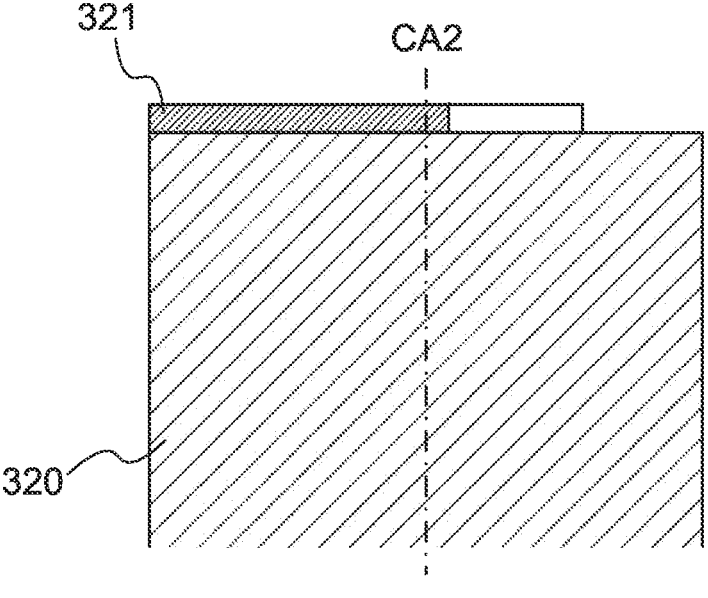

FIGS. 8A and 8B illustrates pump drive section 320 for driving the pump. FIG. 8A is a plan view of pump drive section 320, and FIG. 8B is a sectional view taken along line B-B in FIG. 8A. Pump drive section 320 rotates about second rotational axis CA2.

Pump pressing protrusion 321 for pressing pump 230 is disposed on a top portion of pump drive section 320. In the present embodiment, the shape of pump pressing protrusion 321 is linear protrusions extending from second rotation center CA2 toward the outer circumference of the pump drive section which is circular in plan view.

When pump drive section 320 rotates, pump pressing protrusion 321 drives the pump. Pump drive section 320 is a substantially cylindrical member.

(Introduction of Fluid)

Introduction of a fluid into fluid handling device 200 in advance will be described with reference to FIGS. 9A and 9B.

Figure 9A:
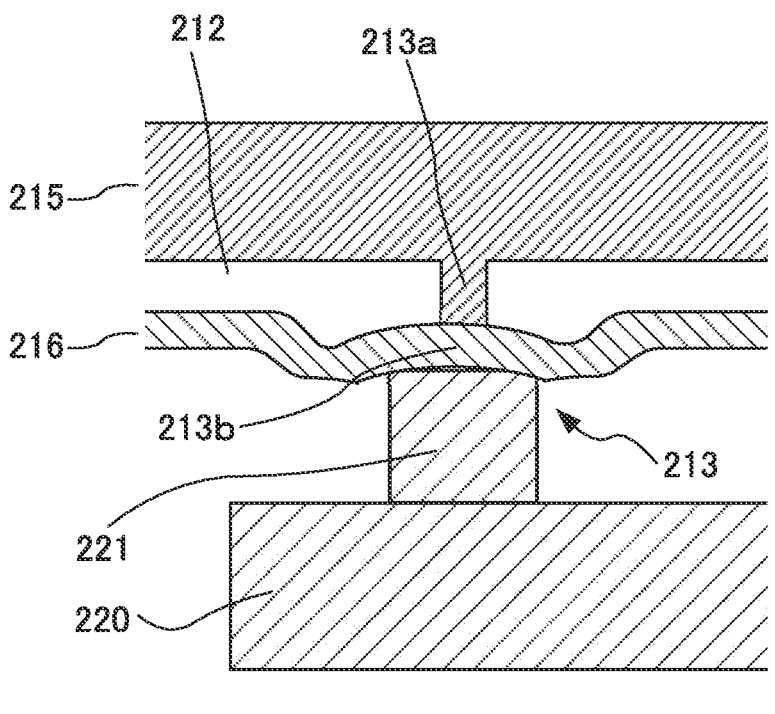
FIGS. 9A and 9B are diagrams illustrating introduction of a fluid into the fluid handling device performed in advance.

FIG. 9A is a schematic view illustrating a state in which first protrusion 221 of pressing member 220 is aligned with valves 213 of channel chip 210 and valves 213 are closed. To achieve this state, it is only necessary that second protrusion 222 of pressing member 220 be inserted into through hole 214 in channel chip 210, and first protrusion 221 be positioned to valves 213.

Figure 9B:
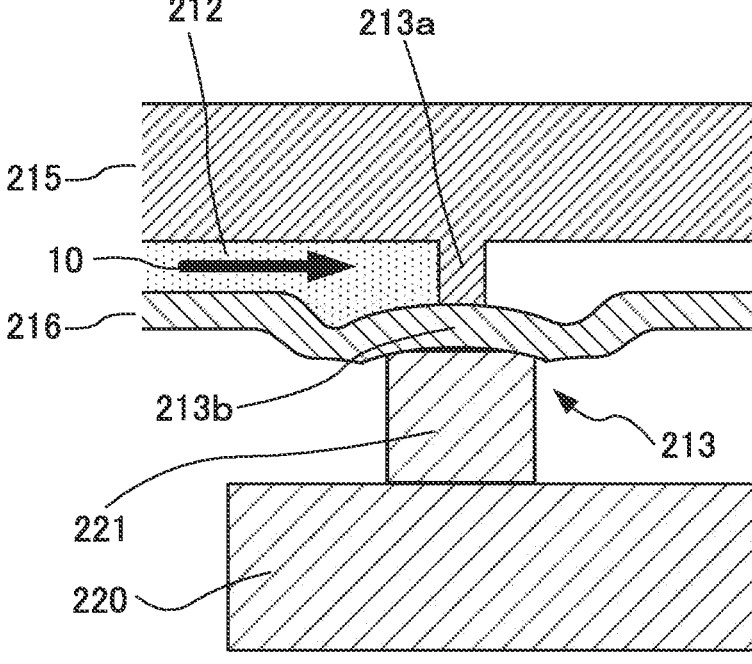

FIG. 9B is a schematic diagram illustrating a state in which fluid 10 is introduced from wells 211 in the state illustrated in FIG. 9A. Since valves 213 are closed, fluid 10 does not flow into channels 212 located downstream from valves 213. In this way, fluid handling device 200 is capable of retaining fluid 10. In addition, fluid handling device 200 in which fluid 10 is retained in advance may be attached to a device having the drive sections.

(Effect)

As described above, in the fluid handling device according to the present embodiment, the fluid can be appropriately retained in the channel chip in advance before the channel chip is attached to the device including the drive sections.

[Variation]

Figure 10A:
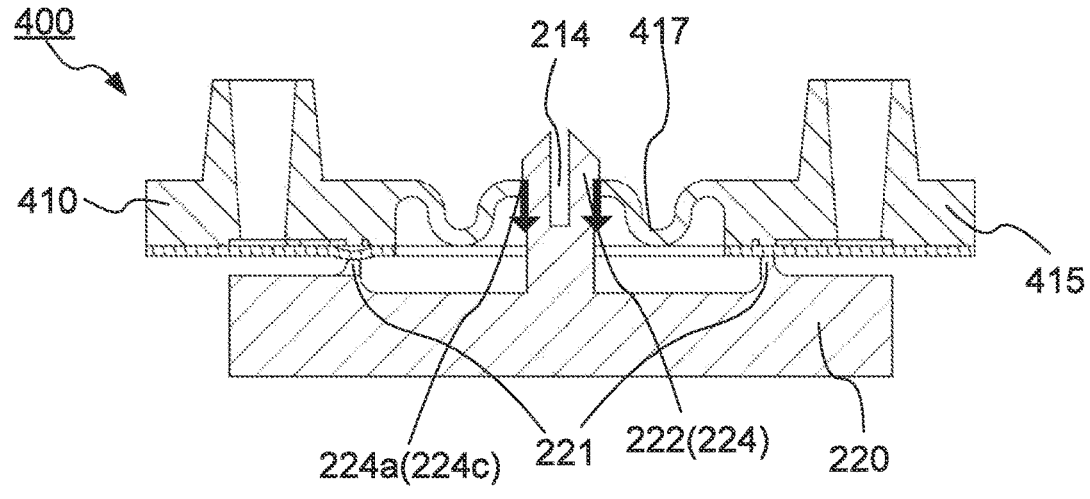
FIGS. 10A to 10C are diagrams illustrating a configuration of a fluid handling device according to a variation.
Figure 10B:
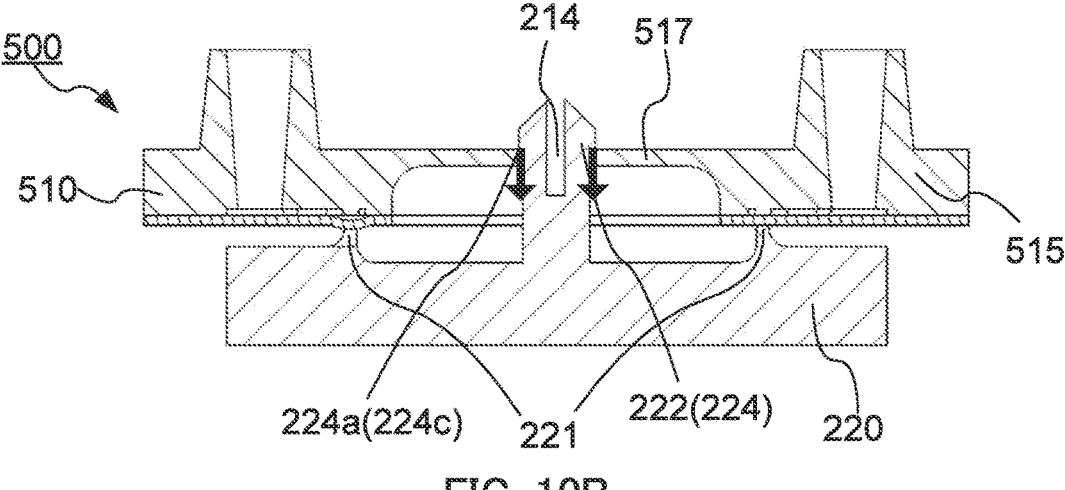
Figure 10C:
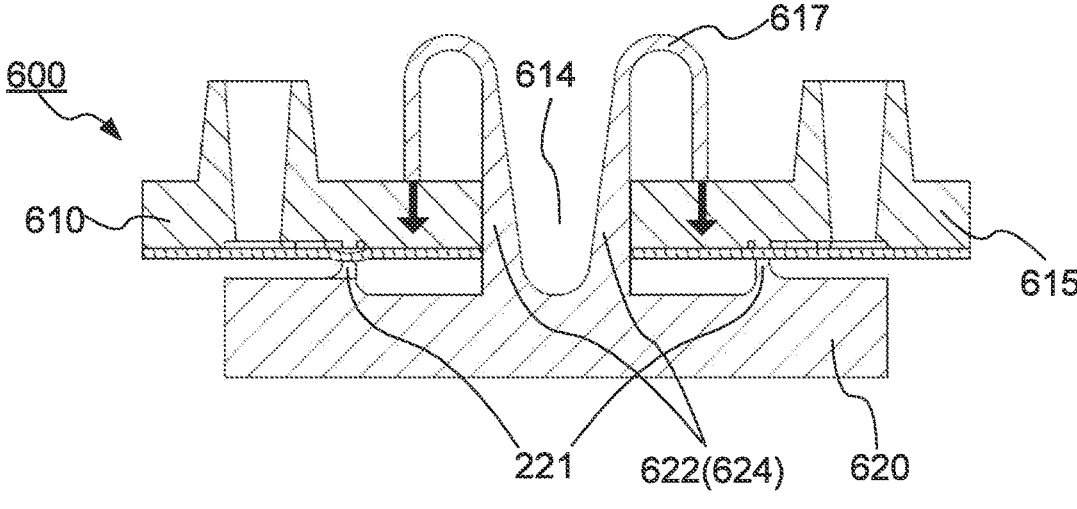

FIGS. 10A, 10B, and 10C illustrate fluid handling devices according to Variations 1, 2, and 3, respectively. The fluid handling devices according to the variations include a spring mechanism for allowing the pressing member (first protrusion 221) to more reliably push the valves of the channel chip. Note that, each of FIGS. 10A, 10B, and 10C illustrates a state in which a portion of first protrusion 221 on the right side is located in a plane of the page and presses the valve located in the plane of the page, while a portion of first protrusion 221 on the left side is located on the farther side from the plane of the page and does not press the valve located on the plane of the page. In FIGS. 10A and 10B, the pressing member in which first protrusion 221 of pressing member 220 illustrated in FIG. 4B is rotated by 90° is used.

(Variation 1)

As illustrated in FIG. 10A, fluid handling device 400 according to Variation 1 includes spring mechanism 417 in which channel chip 410 is engaged with first engagement portion 224 of pressing member 220 and presses channel chip 410 against pressing member 220 (the fluid handling device includes spring mechanism 417 for pressing the valves of channel chip 410 against first protrusion 221 of the pressing member).

Spring mechanism 417 is configured such that a downward force (a force toward pressing member 220) is applied by first engagement portion 224 when the spring mechanism is engaged with first engagement portion 224. Spring mechanism 417 to which the force is applied deforms to press channel chip 410 against pressing member 220. This allows pressing member 220 (first protrusion 221) to more reliably push the valves of channel chip 410.

In Variation 1 illustrated in FIG. 10A, spring mechanism 417 has the following configuration when viewed in a section including the central axis of second protrusion 222. That is, spring mechanism 417 includes a portion extending toward second protrusion 222 and extending parallel to the front surface at the front surface side of channel chip 410, a curved portion (U-shaped portion) curving to extend from the front surface side toward the back surface side and then from the back surface side toward the front surface side, and a contact portion extending parallel to the front surface and making contact with first engagement portion 224.

The number and aspect of the curved portions may be appropriately set in accordance with the desired elasticity of spring mechanism 417. For example, the number of portions extending from the front surface side to the back surface side and the number of portions extending from the back surface side to the front surface side may be set as appropriate in accordance with the desired elasticity of spring mechanism 417. Further, spring mechanism 417 may include a curved portion (inverted U-shaped portion) that curves from the back surface side toward the front surface side and then from the front surface side toward the back surface side. In the present embodiment, one portion extending from the front surface side toward the back surface side and one portion extending from the back surface side toward the front surface side are provided. Thus, spring mechanism 417 includes one curved portion (U-shaped portion).

In addition, the portion making contact with first engagement portion 224 may be appropriately configured in relation to first engagement portion 224 so as to receive a downward force (a force toward the pressing member 220 side) from first engagement portion 224 during contact (engagement) (see the arrows in FIG. 10A). In the present embodiment, first engagement portion 224 including snap-fit structure 224a is inserted into through hole 214, and hook 224c of snap-fit structure 224a makes contact with (is engaged with) the contact portion. At this time, the contact portion is configured to receive a downward force. In this way, the combination of snap-fit structure 224a, which can serve as a spring mechanism, and spring mechanism 417 ensures that first protrusion 221 of the pressing member pushes the valves of channel chip 410.

The thickness of spring mechanism 417 may be appropriately set as long as a spring function can be exerted. In the present embodiment, the thickness of spring mechanism 417 as seen in a section is less than the thickness of substrate 515 of channel chip 510 (the length from a bonding surface of the substrate bonded to the film to the surface of the substrate on which none of the wells and the like are disposed).

Spring mechanism 417 as seen in plan view only has to be disposed to surround at least a portion of second protrusion 222 so as to be engageable with at least the portion of first engagement portion 224. In the present embodiment, spring mechanism 417 is disposed to surround the entire circumference of second protrusion 222. That is, in the present embodiment, the shape of spring mechanism 417 as seen in plan view is annular. Note that, the portion surrounded by annular spring mechanism 417 is above-described through hole 214. Further, spring mechanism 417, which is annular when seen in plan view, may include one or more slits. The slits may extend radially from the center of the annular ring, for example.

Further, in the present embodiment, in plan view, one groove formed by the one curved portion (U-shaped portion) is disposed to surround second protrusion 222. That is, in plan view, the groove formed by the curved portion (U-shaped portion) is annular.

The material of spring mechanism 417 is not particularly limited as long as it has elasticity. It is preferable that the material be the same as that of substrate 415. That is, it is preferable that spring mechanism 417 be integrally formed with substrate 415.

(Variation 2)

FIG. 10B illustrates fluid handling device 500 according to Variation 2. Fluid handling device 500 according to Variation 2 includes spring mechanism 517, and spring mechanism 517 is different in shape from spring mechanism 417 according to Variation 1. The functions exerted by spring mechanism 517 are, as in spring mechanism 417 described above, application of a force, deformation, and pressing channel chip 510 against pressing member 220. (This means that the valves of channel chip 510 are pressed against first protrusion 221 of the pressing member.)

As illustrated in FIG. 10B, spring mechanism 517 has the following configuration when seen in a section including the central axis of second protrusion 222. That is, spring mechanism 517 includes a portion extending parallel to the front surface at the front surface side of channel chip 210 and, at the end of such a portion, a contact portion making contact with first engagement portion 224.

The portion making contact with first engagement portion 224 may be appropriately configured in relation to first engagement portion 224 to receive a downward force (a force toward pressing member 220) from first engagement portion 224 when making contact with (being engaged with) the first engagement portion. (See arrows in FIG. 10B). In the present embodiment, first engagement portion 224 including snap-fit structure 224a is inserted into through hole 214, and hook 224c of snap-fit structure 224a makes contact with (is engaged with) the contact portion. At this time, the contact portion is configured to receive a downward force. In this way, the combination of snap-fit structure 224a, which can serve as a spring mechanism, and spring mechanism 517 ensures that first protrusion 221 of the pressing member pushes the valves of channel chip 510.

The thickness of spring mechanism 517 may be appropriately set as long as a spring function can be exerted. In the present embodiment, the thickness of spring mechanism 517 as seen in a section is less than the thickness of substrate 515 of channel chip 510 (the length from a bonding surface of the substrate bonded to the film to the surface of the substrate on which none of the wells and the like are disposed).

Spring mechanism 517 as seen in plan view only has to be disposed to surround at least a portion of second protrusion 222 so as to be engageable with at least the portion of first engagement portion 224. In the present embodiment, spring mechanism 517 is disposed to surround the entire circumference of second protrusion 222. That is, in the present embodiment, the shape of spring mechanism 517 as seen in plan view is annular. Note that, the portion surrounded by annular spring mechanism 517 is above-described through hole 214. Further, spring mechanism 517, which is annular when seen in plan view, may include one or more slits. The slits may extend radially from the center of the annular ring, for example.

The material of spring mechanism 517 is not particularly limited as long as it has elasticity. It is preferable that the material be the same as that of substrate 515. That is, spring mechanism 517 is preferably integrally formed with substrate 215.

(Variation 3)

In fluid handling device 600 according to Variation 3 illustrated in FIG. 10C, first engagement portion 624 of pressing member 620 includes spring mechanism 617 for pressing channel chip 610 against pressing member 620. (Spring mechanism 617 is provided to press the valves of channel chip 610 against first protrusion 221 of the pressing member).

Spring mechanism 617 has a curved shape (inverted U-shape) that curves to extend from the back surface side of channel chip 610 through through hole 614 so as to protrude from the front surface side of channel chip 610, and then extends toward the front surface of channel chip 610. The end of the portion extending toward the front surface is a contact portion that makes contact with the front surface of channel chip 610. The contact portion applies a downward force to channel chip 610 to press channel chip 610 against pressing member 620. The curved shape may be appropriately configured so as to exert this function. Note that, in the embodiment illustrated in FIG. 10C, the portion extending toward the front surface is substantially vertical, but the portion may be inclined so as to approach the front surface with increasing distance from the center of second protrusion 622. Further, it is preferable that spring mechanism 617 be configured to be capable of passing through through hole 614 when channel chip 610 and pressing member 620 are combined together. In addition, when spring mechanism 617 is seen in a section, there is one spring mechanism on each of the left and right sides of the center of second protrusion 622. As described above, fluid handling device 600 according to Variation 3 includes spring mechanism 617. Accordingly, fluid handling device 600 makes it possible to further ensure that first protrusion 221 of the pressing member pushes the valves of channel chip 610 without having snap-fit structure 224a capable of serving as a spring mechanism that the above-described embodiments include.

The thickness of spring mechanism 617 may be appropriately set as long as a spring function can be exerted. In the present embodiment, the thickness of spring mechanism 617 as seen in a section is smaller than the thickness of pressing member 620.

Further, spring mechanism 617 as seen in plan view is rectangular.

The material of spring mechanism 617 is not particularly limited as long as it has elasticity. It is preferable that the material be the same as that of pressing member 620. That is, it is preferable that spring mechanism 617 be integrally formed with pressing member 620.

INDUSTRIAL APPLICABILITY

The fluid handling device according to the present embodiment and the fluid handling system using the same are useful in various applications such as clinical tests, food tests, and environmental tests, for example.

REFERENCE SIGNS LIST

10 Fluid
200, 400, 500, 600 Fluid handling device
210, 410, 510, 610 Channel chip
211 Well
212 Channel
213 Valve
213*a* Valve seat
213*b* Diaphragm
214, 614 Through hole
215, 415, 515, 615 Substrate
216 Film
220, 620 Pressing member
221 First protrusion
222, 622 Second protrusion
223 Third protrusion
224, 624 First engagement portion
224*a* Snap-fit structure
224*b* Leaf spring
224*c* Hook
225 Second engagement portion
230 Pump
300 Fluid handling system
310 Valve drive section
311 Third engagement portion
320 Pump drive section
321 Pump pressing protrusion
417, 517, 617 Spring mechanism

The invention claimed is:

1. A fluid handling device, comprising:
a channel chip including:
a well for containing a fluid,
a channel connected to the well,
a valve disposed on the channel, and
a through hole which has an opening located on a front surface of the fluid handling device and an opening located on a rear surface of the fluid handling device; and
a pressing member including a first protrusion and a second protrusion, the first protrusion being for pressing the valve to close the valve, the second protrusion being inserted into the through hole and being for positioning the first protrusion with respect to the valve, the pressing member being rotatable about a rotational axis extending through the second protrusion,
wherein the first protrusion is disposed to move along a circle centered on the rotational axis extending through the second protrusion, when the pressing member rotates about the rotational axis.

2. The fluid handling device according to claim 1, wherein:
the channel chip includes a plurality of the valves, and
the plurality of valves are disposed on a circle centered on the through hole.

3. The fluid handling device according to claim 1, wherein the second protrusion includes an engagement portion configured to be engaged with the channel chip when inserted into the through hole.

4. The fluid handling device according to claim 1, wherein the pressing member includes a third protrusion disposed between the first protrusion and the second protrusion, the third protrusion being for preventing the channel chip from bending when the first protrusion presses the valve.

5. The fluid handling device according to claim 3, wherein the channel chip has a spring mechanism configured to be engaged with the engagement portion and to press the channel chip against the pressing member.

6. The fluid handling device according to claim 3, wherein the engagement portion has a spring mechanism configured to press the channel chip against the pressing member.

7. A fluid handling system, comprising:
a fluid handling device according to claim 1; and
a drive section for rotating the pressing member.

* * * * *